United States Patent [19] [11] Patent Number: 4,798,431
Clark et al. [45] Date of Patent: Jan. 17, 1989

[54] OPTIC FIBER CONTACT

[75] Inventors: Kenneth M. Clark, Irvine; Leslie M. Borsuk, Los Alamitos; Bruce Coutts, Costa Mesa, all of Calif.

[73] Assignee: ITT Corporation, New York, N.Y.

[21] Appl. No.: 129,797

[22] Filed: Dec. 7, 1987

Related U.S. Application Data

[63] Continuation-in-part of Ser. No. 937,575, Dec. 4, 1986, and a continuation-in-part of Ser. No. 2,883, Jan. 13, 1987.

[51] Int. Cl.[4] .......................... G02B 6/36; G02B 7/26
[52] U.S. Cl. ........................... 350/96.20; 350/96.18; 350/96.21
[58] Field of Search ................ 350/96.18, 96.20, 96.21

[56] References Cited

U.S. PATENT DOCUMENTS 4,191,447  3/1980  Borsuk ............................ 350/96.20
4,327,963  5/1982  Khoe et al. ...................... 350/96.20
4,598,974  7/1986  Munn et al. ..................... 350/96.21

FOREIGN PATENT DOCUMENTS 5220843  2/1977  Japan .
 102911  6/1983  Japan .

Primary Examiner—William L. Sikes
Assistant Examiner—Robert E. Wise
Attorney, Agent, or Firm—T. L. Peterson

[57] ABSTRACT

An optic fiber connection system is provided which enables the forming of a lens or bead at the end of an optic fiber by an electric arc established between a pair of electrodes, which avoids degradation of the electrodes with use. The contact has a forward portion with a hole along its axis for receiving the optic fiber, and a cross aperture extending perpendicular to the hole to receive the end of the optic fiber. The forward portion of the contact is formed of a ceramic or other high melting temperature dielectric, to allow the electrodes to be widely spaced to avoid their degradation, without shorting out the electric arc.

8 Claims, 2 Drawing Sheets

OPTIC FIBER CONTACT

CROSS-REFERENCE TO RELATED APPLICATION

This is a continuation-in-part of U.S. application Ser. No. 937,575 filed Dec. 4, 1986 by Clark and Borsuk, and a continuation-in-part of U.S. application Ser. No. 002,883 filed Jan. 13, 1987 by Clark and Coutts.

BACKGROUND OF THE INVENTION

A pair of optics fibers can be optically coupled by forming lenses at the ends of the optic fibers and positioning the lenses substantially in alignment and at approximately a predetermined spacing. One technique for accomplishing this is to insert the fiber through a hole in a contact so the end of the fiber lies in a cross-aperture in the end portion of the contact. A pair of electrodes are placed on either side of the fiber, in line with the cross-aperture, and an electric arc is established between the electrodes to melt the fiber end to form a nearly spherically shaped lens thereon.

Fiber optic contacts can be formed of stainless steel for high precision, or of molded plastic for lower cost production. When using such contacts, care must be taken to assure that the electric arc is not short-circuited and does not melt the contact. Japanese patent No. 58-102911 by Takashima describes a technique wherein the electrodes have flat ends and lie closely on either side of the fiber. Such closely spaced electrodes appear to confine the arc to just the fiber, which could avoid short-circuiting the arc through a metal contact or melting a plastic, or polymer, contact. When only a small arc current is used, to splice a pair of fibers to join them, such close spacing of the electrodes works well. However, when a larger arc current is used to melt the end of a fiber into a lens of greater diameter than the fiber, it is found that the electrodes become degraded after repeated use, so the arcs become erratic. An arrangement which enabled the forming of a fiber end into a lens of greater diameter than the fiber, in a cross-aperture of a contact end, in a consistent manner, would be of considerable value.

SUMMARY OF THE INVENTION

In accordance with one embodiment of the present invention, an optic fiber connection apparatus is provided which facilitates the repeatable formation of an enlarged lens at the end of an optical fiber. The contact has a hole extending along its axis for receiving the optic fiber, and includes a cross aperture at the front of the contact along which an electric arc can be established between a pair of electrodes lying on opposite sides of the fiber. The contact includes a forward end portion formed of a ceramic or other high melting temperature material in which the cross-aperture is formed. The arc electrodes are widely spaced, which avoids an erratic arc over a period of time when lenses are repeatedly formed, while avoiding short circuiting of the arc by the contact or melting of the contact.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
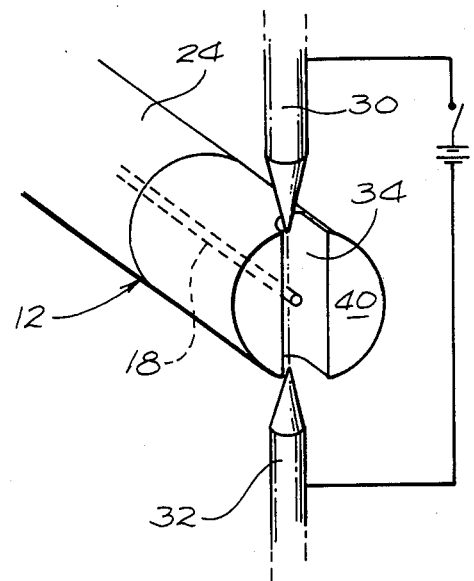
FIG. 1 is a perspective view of a contact of the present invention, showing the manner in which a lens is formed on an optic fiber.
Figure 2:
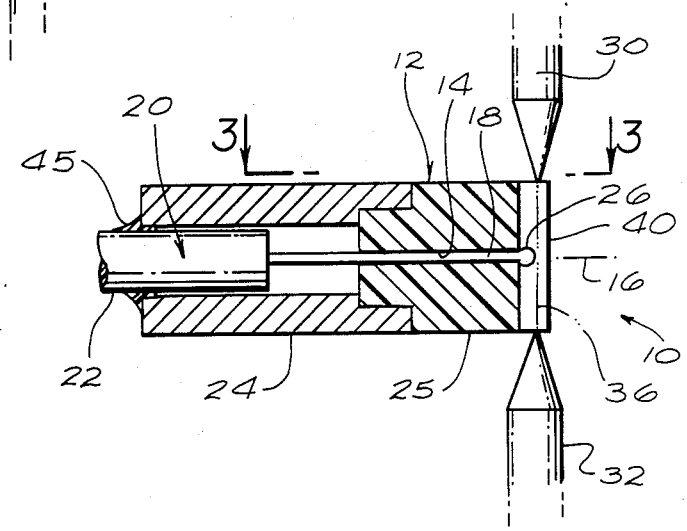
FIG. 2 is a sectional view of the apparatus of FIG. 1.
Figure 3:
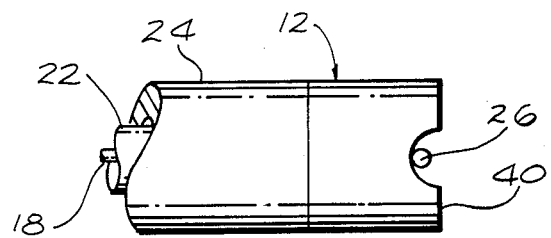
FIG. 3 is a view taken on the line 3—3 of FIG. 2.

FIG. 2 illustrates an optic fiber connection apparatus 10 which includes a contact 12 which has a longitudinal passage or hole 14 extending along its axis 16, for receiving an optic fiber 18. The optic fiber is part of an optic fiber assembly 20 which includes a buffer 22 whose front end has been stripped off. The contact 12 includes a ferrule 24 and a bushing 25 mounted on the front end of the ferrule. In order to effectively couple the front end of the optic fiber to another similar optic fiber, a lens or bead 26 is formed at the end of the fiber, by heating the fiber end into a bead having a rounded and optically clear end. The contact 12 may be used to couple the optic fiber 18 to an external optical device, such as to another similar optic fiber as described above, or to a light source (not shown) or light detector (not shown). One method for heating the optic end is to position a pair of electrodes 30, 32 on opposite sides of the optic fiber end on an imaginary line 36 that extends along a cross-aperture through the optic fiber, and applying a voltage between the electrodes to establish an arc between them that passes across the optic fiber to heat it. This heating method has been found to produce nearly spherical lenses of diameters that are predictable within about three percent. The contact is formed with a cross-aperture 34 that provides access to the optic fiber end to form the lens thereon.

The cross-aperture 34 extends along a direction 36 that is largely perpendicular to the axis 16 of the contact along which the hole extends. This enables the lens 26 to be initially formed at a location rearward of the front end 40 of the contact. The optic fiber therefore does not have to be pulled rearwardly after the lens is formed. A typical optic fiber has a diameter of about 125 μm (about 5 thousandths inch), while the lens 26 on such a fiber may have a diameter of about 200 μm (about 8 thousandths inch).

Figure 5:
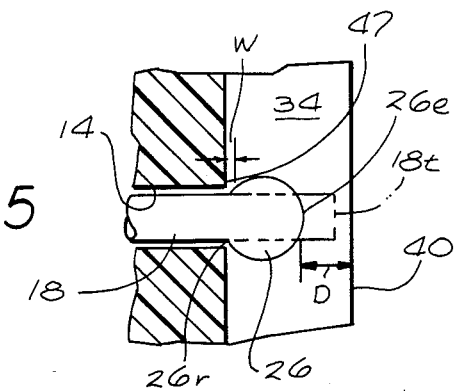
FIG. 5 is an enlarged partial sectional view of the apparatus of FIG. 2.

The lens 26 is preferably formed so upon its formation it lies at the final position it is to assume for coupling to another optic fiber. As shown in FIG. 5, this can be accomplished by locating the tip 18t of the unlensed optic fiber end, at a position where it will form a lens whose end 26e is spaced at a predetermined distance D from the contact end. The tip 18t is located so the volume of the unlensed fiber between the fiber tip 18t and the desired position of the root 26r of the bead, equals the volume of the lens 26 to be formed. Prior to the lens 26 being formed, the optic fiber assembly can be permanently fixed in position in the connection 12, without the need to slide the optic fiber 18 along its length after the lens 26 has been formed. Avoidance of the need to slide the lensed fiber, especially in the rearward direction, minimizes the danger of damage to the lens. In the final position, the lens root 26r is spaced a distance w forward of the end walls 47 of the hole.

In the prior art, the entire contact 12 has been constructed of stainless steel, to provide high rigidity and strength, although a high strength plastic could be used. With the line 36 connecting the tips of the arc electrodes extending through the cross-aperture 34, care must be taken to avoid either short-circuiting the arc through the closely-surrounding cross-aperture walls, or the melting of such cross-aperture walls. One approach would be to place the tips of the electrodes 30, 32 closely on either side of the optic fiber, to prevent the arc from passing to the walls of the cross-aperture or from melting such walls. Such close spacing of the electrodes works well where a low arc current is sufficient, as when splicing the ends of a pair of fibers wherein the fiber ends only have to be softened. However, where a much larger arc current and/or duration (e.g. 30 milliampers for 3 to 6 seconds for a 125 μm to 250 μm fiber) is required, to melt the fiber end to form a molten ball that becomes a lens larger than the fiber, applicant has found that such close electrode spacing is unsatisfactory. It is found that the arc becomes erratic after the electrodes have been used several times, so that it is difficult to produce lenses of consistent size. Applicant believes the degradation of the electrodes is due to silica vapor from the molten fibers depositing of the electrode tips.

Applicant avoids degradation of the electrodes with their repeated use to form lenses at the ends of optic fibers, by spacing the electrode tips far apart compared to the fiber diameter. The spacing A (FIG. 2) of the electrode tips is preferably equal to more than half the length of the cross-aperture through which the arc passes. The spacing is preferably at least eight times the fiber diameter (i.e. for a 125 μm diameter fiber the spacing is preferably at least 0.040 inch, or one-twentieth of an inch). To prevent the arc from short-circuiting through the contact wall that forms the cross-aperture, the front end of the contact, formed by the bushing 25, is formed of a dielectric. To prevent the arc from melting the bushing, the bushing is formed of a high melting temperature dielectric material. A ceramic, which is a material formed of a nonmetallic mineral at high temperatures that are above the melting temperature of the optic fiber and which have a melting temperature above the softening temperature of the optic fiber, and preferably above its melting temperature, is used. Optic fibers include a cladding and a core within the cladding. Typical optic fibers have claddings that soften at 1040° C., and have cores that soften at 1600° C. and melt at 2200° C. to 2400° C. Thus, the bushing material is a dielectric which softens and melts only at a temperature of over 1600° C., and preferably at over 2200° C.

The optic fiber assembly can be fixed in place, as by applying epoxy 45 (FIG. 2) between the buffer 22 and holder 24, or by crimping the optic fiber assembly in place. The fact that the optic fiber does not have to be pulled back results in avoiding the danger that the lens will be broken off by being pulled against the end walls 47 (FIG. 5) of the end of the narrow contact hole.

Figure 4:
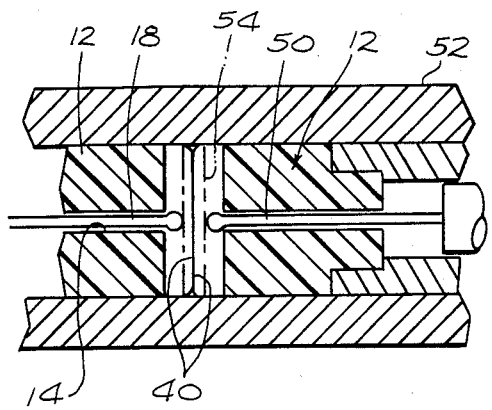
FIG. 4 is a sectional view of a connection assembly which includes the contact and optic fiber shown in FIG. 2.

FIG. 4 illustrates a connection system where the optic fiber 18 is optically coupled to another similarly mounted optic fiber 50. The contacts 12 which hold the two optic fibers are mounted in a housing 52 which holds the connectors in alignment, with their ends 40 in abuttment. A transparent intermediate sheet 54 is sometimes placed between the lenses to facilitate their coupling. Although the lenses at the ends of the two optic fibers provide good coupling over a range of separations, it is still important to maintain their separation within such a range.

Figure 6:
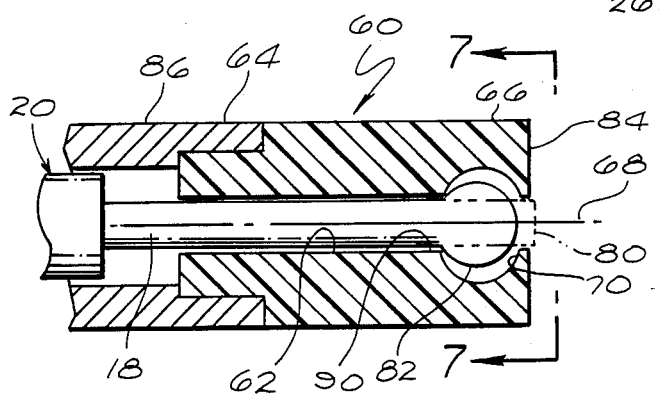
FIG. 6 is a sectional view of an optic fiber connection assembly constructed in accordance with another embodiment of the invention.
Figure 7:
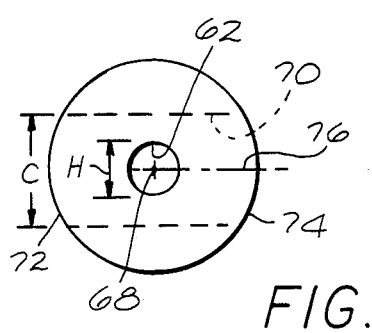
FIG. 7 is a view taken on the line 7—7 of FIG. 6.
Figure 8:
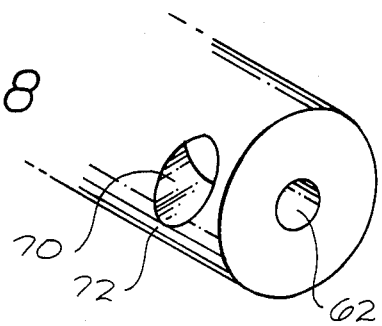
FIG. 8 is a partial perspective view of the connector of FIG. 6.

FIGS. 6-8 illustrate another optic fiber connector 60 which includes a hole 62 extending through the entire length of the contact between its opposite end portions 64, 66, along the axis 68 of the connector. A cross-aperture 70 of greater width C than the diameter H of the hole extends between opposite sides 72, 74 of the contact along a direction of axis 76 which is substantially perpendicular to the axis 68 of the hole. Electrodes can be positioned in line with the cross-aperture 70 on opposite sides of the hole axis 68 to create an arc that passes through the cross-aperture to melt an optic fiber whose tip initially lies at the position 80. The resulting lens 82 lies within the cross-aperture 70.

As mentioned above, the diameter of the lens formed by an arc extending between electrodes can be closely predicted. The diameter C of the cross hole is preferably no more than 50% greater than the diameter of the bead or lens 82. Also, the diameter of the hole 62 is less than the diameter of the lens. The final position of the lens is the same as the position at which the lens is formed, so the optic fiber does not have to be moved axially after the lens is formed and before the optic fiber assembly is fixed in place.

Thus, the invention provides an optic fiber connection apparatus and method, which enables the consistent forming of a lens of greater diameter than an optical fiber at the end of the fiber. A contact having a hole through which the fiber extends, includes a cross-aperture at its end through which an arc can extend between a pair of electrode tips, to melt the fiber end into an enlarged lens. The contact end is preferably formed of a ceramic material to enable the arc electrodes to be widely spaced to provide for consistent lensing, without short circuiting the arc or melting the contact end.

Although particular embodiments of the invention have been described and illustrated herein, it is recognized that modifications and variations may readily occur to those skilled in the art, and consequently, it is intended that the claims be interpreted to cover such modification and equivalents.

What is claimed is:

1. Optic fiber connection apparatus comprising:
   a contact having forward and rearward end portions, opposite sides, and an axis, and having a hole extending along said axis for receiving an optical fiber which has a front end, said contact forward end portion having a cross-aperture which extends substantially perpendicular to said axis and which intersects said hole to receive a lens lying at the front end of an optic fiber which extends through said hole, said contact forward end portion including a front end for coupling to an external optical device;
   said cross-aperture extending through said contact between its opposite sides to pass an electric arc that can melt the end of an optic fiber to form a lens;
   said contact forward end portion being formed of a dielectric material having a melting temperature above 1600° C., to allow an arc to pass through most of the length of the cross-aperture without shorting out the arc or melting the contact.

2. The apparatus described in claim 1 including:
a pair of electrodes lying on opposite sides of said axis and on an imaginary line which extends substantially along said cross-aperture, and means connected to said electrodes for applying a voltage between them that establishes an arc between them, said electrodes having tips spaced apart by most of the length of said cross-aperture.

3. The apparatus described in claim 1 wherein:
said contact includes a ferrule with a front end and a bushing mounted on said ferrule front end, said bushing formed of said dielectric material and forming said hole extending along said axis, said ferrule having an aperture extending along said axis, said hole in said bushing being smaller than said aperture.

4. The apparatus described in claim 1 wherein:
said dielectric material is a ceramic having a melting temperature of over 2200° C.

5. In an optic fiber connection system wherein an optic fiber extends through a hole at the axis of a contact into a cross-aperture at the front of the contact, and the optic fiber has a forward end that forms a lens of greater diameter than the rest of the fiber and that lies in the cross-aperture, the improvement wherein:
said contact includes a ferrule with a hole along said axis and with a forward end, and also includes a bushing mounted on the forward end of said ferrule, said bushing having a hole along said axis which is of smaller diameter than the hole in said ferrule and which closely surrounds said fiber, said bushing forming said cross-aperture, said bushing being formed of a dielectric material which has a melting temperature greater than the melting temperature of said optic fiber.

6. The improvement described in claim 5 wherein:
said dielectric material is a ceramic material which softens and melts at a temperature above 2200° C.

7. Optic fiber connection apparatus for holding an optic fiber having a front end forming a lens of greater diameter than the rest of the optic fiber, comprising:
a contact having forward and rearward end portions, opposite sides, and an axis, and having a hole extending along said axis with said optic fiber front end lying in said hole, said contact forward end portion having a cross-aperture which extends substantially perpendicular to said axis and which intersects said hole, said lens of said optic fiber lying in said cross-aperture;
said cross-aperture extending through said contact between its opposite sides to pass an electric arc for initially melting a most forward end of the optic fiber into said lens;
said contact forward end portion being formed of a dielectric material having a melting temperature greater than the melting temperature of said optic fiber, and the width of said contact along said cross-aperture being greater than eight times the diameter of said optic fiber.

8. The apparatus described in claim 7 wherein:
the melting temperature of said dielectric material is above 1600° C., the diameter of said fiber is about 5 cross-aperture is more than 40 thousandths inch.

* * * * *